United States Patent [19]

Greco

[11] Patent Number: 5,427,521
[45] Date of Patent: Jun. 27, 1995

[54] VALVE FLUSHING MECHANISM FOR USE WITH INCINERATORS

[75] Inventor: Richard Greco, Matawan, N.J.

[73] Assignee: Rose Controls Corp., Nazareth, Pa.

[21] Appl. No.: 232,760

[22] Filed: Apr. 25, 1994

[51] Int. Cl.$^6$ ............................................. F23D 14/00
[52] U.S. Cl. ....................................... 431/5; 432/180;
432/181; 432/182; 110/212; 110/214; 110/235
[58] Field of Search ..................... 431/5; 110/212, 214;
432/181, 180, 182

[56] References Cited

U.S. PATENT DOCUMENTS 4,164,236  8/1979  Owen et al. ........................ 137/240
5,098,286  3/1992  York ................................. 432/181

Primary Examiner—Henry A. Bennet
Assistant Examiner—Siddharth Ohri
Attorney, Agent, or Firm—Howard & Howard

[57] ABSTRACT

A valve flushing system supplies a cleaning gas to a relatively large plenum, which in turn communicates with a restricted passage directing the flow along a face of the valve disk. In a main feature of this invention, a flushing gas flow moves through a restricted path along a face of a valve disk away from a valve disk contact area with a valve seat. In this way, the flushing gas prevents a potential leakage gas flow from approaching the valve/valve seat interface. In this way, leakage is reduced. Although the efficiency of the system may be reduced by a small amount, the resulting prevention of leakage more than justifies this potential small decrease in efficiency. The use of the relatively large plenum ensures that there will be complete and adequate coverage of the valve disk preventing any leakage across the valve disk. In an important feature of this invention, supply passages extend into the plenum along a direction which does not include a component moving in the direction of the valve disk. In this way, it is ensured that the gas leading into the plenum circulates thoroughly within the plenum, and that the plenum is adequately supplied with gas such that it is able to fully prevent leakage across the valve disk.

8 Claims, 1 Drawing Sheet

VALVE FLUSHING MECHANISM FOR USE WITH INCINERATORS

BACKGROUND OF THE INVENTION

This application in general relates to a mechanism for preventing leakage of gas flow across a valve/valve seat interface, and has particular application in the use of valves in regenerative incinerators.

Regenerative incinerators having a combustion chamber which communicates with several heat exchangers are known. Each of the heat exchangers serially receive cool "dirty" air to be cleaned which passes through the heat exchanger and into the combustion chamber and then hot "clean" air which leads from the combustion chamber through a second heat exchanger. A purge gas is a relatively clean gas typically driven through a heat exchanger which had previously been receiving cool air, to drive all "dirty" air from that heat exchanger before it switches to receiving the hot clean air. By alternatively passing cool air and then hot air through the heat exchanger, the heat exchangers are cyclically heated and cooled. The "dirty" air passing through the heat exchanger and into the combustion chamber is thus heated towards its ignition temperature prior to entering the combustion chamber. In this way, the efficiency of the combustion process is increased, and greater volumes of gas may be processed.

With prior art systems, each of the heat exchangers are cyclically in an inlet mode, a purge mode, and then an outlet mode. Complicated valving systems are necessary to properly communicate the heat exchangers to a source of dirty gas, to a downstream source for delivery of the clean gas from the combustion chamber, or to communicate a clean purge gas to the heat exchanger chamber. It is important that there be a minimal amount of leakage across any valve, since strict regulations control the amount of dirty gas which may enter the atmosphere.

It is known in the prior art to selectively communicate a pressurized gas to the interface between a valve seat and the valve disk to attempt to prevent the flow of leakage gas across the valve seat. Such prior art attempts have typically directed a small amount of pressurized gas perpendicularly into a groove at an intermediate location in a valve/valve seat contact area, and used the pressurized gas as a barrier in an attempt to prevent leakage across the valve/valve seat contact area. The prior art systems have not been fully successful, since the conduits have delivered the gas to the grooves over a relatively small circumferential extent, and the gas flow within the recess has not been satisfactory.

In the known prior art, the small conduits have not adequately supplied the clean gas around the entire circumference or perimeter of the valve disk. Further, since the grooves have received the clean gas having a momentum already leading towards the valve disk, the gas is not always adequately circulated within the groove to provide complete coverage of the valve disks. Also the prior system creates an air "bubble" in the groove which tends to lift the disk off the seat. Due to these features, the prior art systems have not always adequately prevented leakage.

SUMMARY OF THE INVENTION

In a broad sense, Applicant's invention here is to drive a flushing or purging gas flow through a restricted passage radially inwardly along a valve disk face. This flushing gas prevents any flow of a potentially leaking gas from reaching the valve/valve seat interface. Since the gas is prevented from even reaching the valve/valve seat interface, any imperfection in the seating contact between the two will not result in leakage flow.

In a disclosed embodiment of the present invention, a valve disk is selectively seated on a valve seat. A valve flushing system communicates a source of gas to a relatively large volume plenum, which in turn communicates with a restricted passage. The restricted passage and the upstream plenum, ensure a large back pressure for the clean gas used for flushing the valve disk. Further, the relatively large plenum ensures that the cleaning or flushing gas communicates with all portions of the restricted path leading to the interface between the valve disk and valve seat. Gas for flushing the valve disk flows along the valve disk face preventing any leakage.

Further, the flushing gas is also directed to the area of the valve disk shaft to prevent leakage. The prior art did not adequately seal at the shaft area. In a preferred embodiment of this invention, the plenum is relatively large, and a flow passage leading into the plenum extends at an angle which includes no component in a direction towards the valve seat. In this way it is ensured that the gas reaches the plenum, and is thoroughly mixed within the plenum before passing along the valve face. This facilitates movement of the flushing gas over the entire circumference of the valve. In a first embodiment, the passage leading into the plenum extends at an angle with a component in a direction away from the valve. In a second embodiment, the passage leads at an angle perpendicular to a direction leading towards the valve.

The two embodiments of this invention include distinct structure for creating the plenum. Preferably there is no contact between the restricter plate which forms the restricted passage and the valve disk. The purging gas flow is bent to flow perpendicularly across the valve disk face.

These and other features of the present invention can be best understood from the following specification and drawings, of which the following is a brief description.

DETAILED DESCRIPTION OF PREFERRED EMBODIMENT

Figure 1:
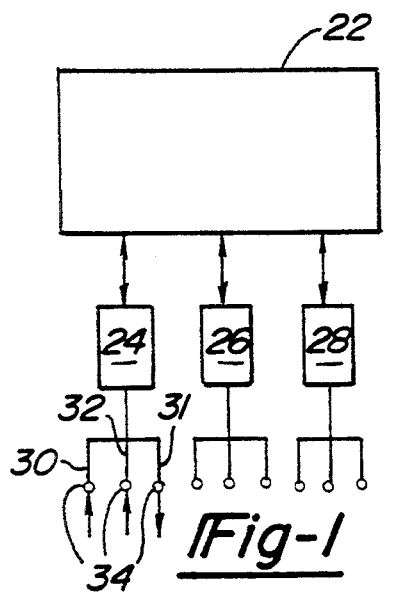
FIG. 1 is a highly schematic view of an incinerator system.

An incinerator system 20 is illustrated in FIG. 1 incorporating a combustion chamber 22 which selectively and serially communicates with heat exchanger chambers 24, 26 and 28. Each of the heat exchanger chambers have a flow passage selectively communicating with the combustion chamber. As is known in the prior art, one of the heat exchange chambers is typically passing an inlet flow of gas to be cleaned into the combustion chamber 22. At the same time, a second of the heat exchange chambers is receiving a hot cleaned gas from the combustion chamber. Preferably, the third heat exchange chamber is in a purge mode wherein any remaining dirty gas from a previous inlet is being passed out of the heat exchange chamber and into the combustion chamber. By serially and cyclically changing each of the heat exchange chambers 24, 26 and 28, between the inlet, purge and outlet modes, one may cyclically and continuously process a relatively large volume of gas.

As also shown in FIG. 1, each heat exchange chamber communicates with an inlet passage 30, an outlet passage 31 and a purge passage 32. Each of these passages receives a valve 34 which controls a gas passing through that respective passage 30, 31 and 32. The aspects of this invention which are inventive extend to a flushing system for preventing leakage across valves 34. In particular, the valve 34 associated with inlet passage 30 must prevent leakage or some "dirty" gas may intermix into the "clean gas" being directed to outlet passage 31. The structure of the system illustrated in FIG. 1 other than this valve flushing system is as known in the art, and no further description is deemed necessary.

Figure 2:
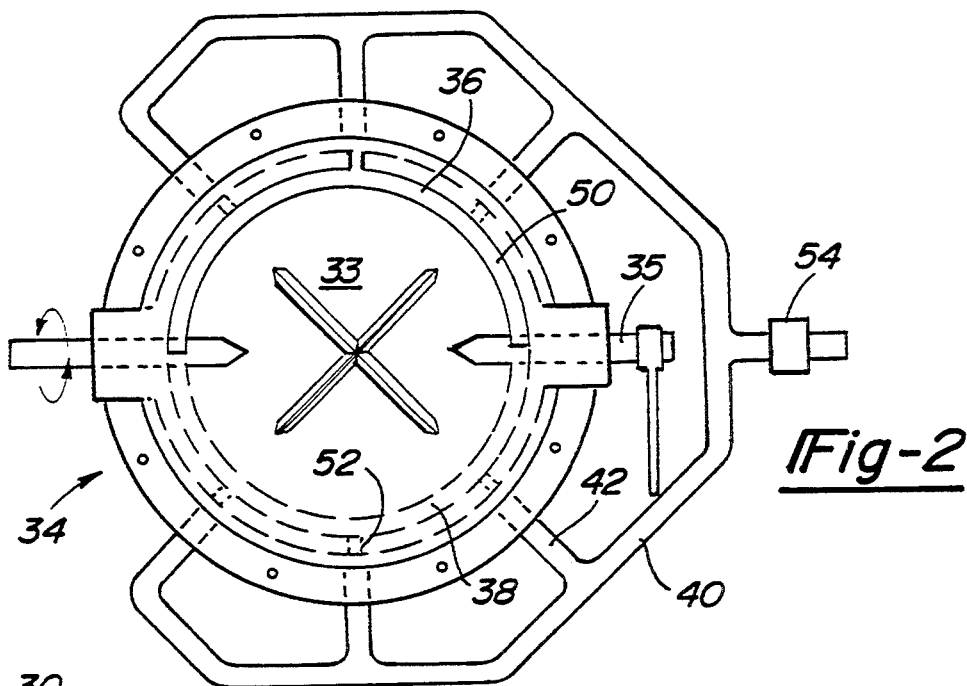
FIG. 2 is a partially schematic top view of a valve incorporating an inventive flushing mechanism.

As shown in FIG. 2, valve 34 incorporates valve disk 33 having a pivot bar 35 which allows the valve to pivot into and out of the paper along an axis of bar 35. As will be explained below, approximately one half of the surface area of the valve disk 33 is seating on a first valve seat above the plane of this figure, while the other half of the valve disk 33 is seating on a second valve seat below the plane of this figure.

A restricted passage 36 is formed by a restricter plate as will be better shown below, around approximately one-half of the perimeter of valve disk 33. Similarly, a restricted passage 38 is formed by a restricter plate associated with the opposed face of valve disk 33, again around approximately one-half of the perimeter of valve disk 33. Note also that passages 36 and 38 extend beyond pivot bar 35. The purging action to be described below will also prevent leakage at pivot bar 35.

Figure 3:
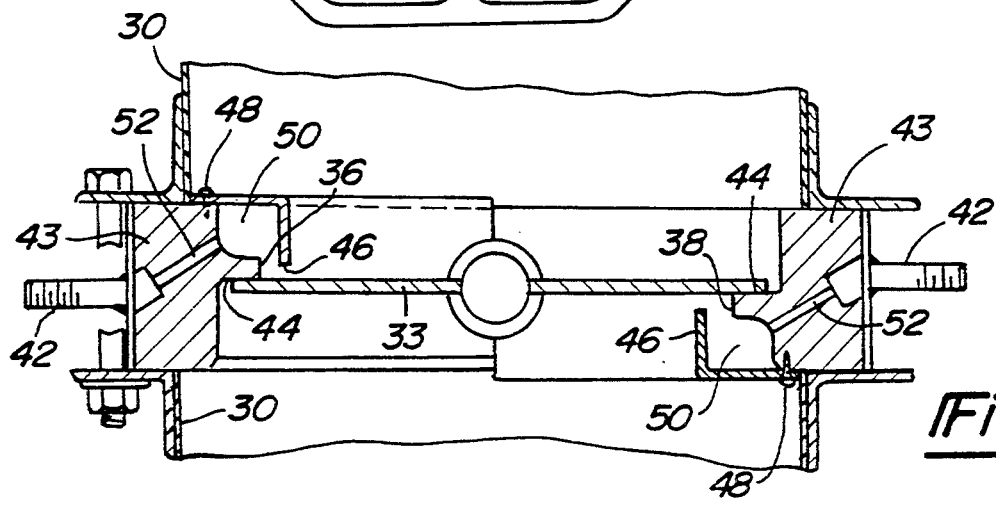
FIG. 3 is a cross-sectional view through the valve illustrated in FIG. 2.

As shown in FIG. 3, the valve disk 33 has pivot bar 35 for selectively rotating the valve between open and close positions. In the open position, gas can flow through the passage, such as inlet passage 30. A pair of valve seats 44 are formed on valve seat body 43. As shown, the valve seats are in contact with the valve disk at a location spaced radially outwardly of a restricter plate 46. The restricter plate or plenum enclosure 46 has a portion 48 extending towards valve disk 33. As shown, a relatively large plenum 50 is defined upstream of a restricted passage 36. Passage 36 allows purging gas to flow along valve disk 33. Similarly, restricted passage 38 is formed on the other side of the valve. Restricter plate 46 is spaced from valve disk 33 such that there is a clearance and no seating contact at their interface. A passage 52 leads from flow passage 42 at an angle away from the valve/valve seat interface 44 into plenum 50.

The relatively high back pressure flushing gas also flows around the restricter plate 46 in the area of the pivot bar 35, thus preventing leakage at the location of pivot bar 35. There will be leakage of the flushing gas into the main gas flow, but as with the rest of the purging gas, the benefits or preventing leakage outweigh any small decrease in efficiency. The inventive valve flushing mechanism prevents leakage of dirty gas to be cleaned from reaching a clean gas outlet line.

As is shown in FIGS. 2 and 3, there may be two or more of the passages 52 associated with two passages 42 for each side of the valve disk 33. As also shown in FIG. 2, a main flow line 40 communicates with the source of clean air which in turn communicates with the supply passages 42 being directed to each side of the valve disk 33.

In operation, when the valve disk 33 is in its open position, a pressure sensitive valve 54 (FIG. 2) upstream of the line 40 will be closed to minimize the flow towards the valve disk. When the valve disk 33 is in the closed position illustrated in FIG. 3, valve 54 is opened and pressurized gas is communicated through lines 40, and supply passages 52 into the plenums 50. Since there is a relatively large volume of fluid in the plenums 50, and since plenums 50 extend around half of the perimeter of the valve disk 33 the volume of the plenum is relatively large. In this way, the problem associated with the prior art valve flushing systems of supply passages being inadequate to ensure that the pressurized gas communicates with the entire perimeter, is eliminated. Further, since the flow passage 52 leads at an angle opposed to a direction towards the valve seat, and since the plenum 50 is relatively large, it is ensured that the plenum 50 is always adequately supplied with gas which is moving in various directions. This gas is thus able to communicate with the entire half of the perimeter of the valve disk 33 and supply adequate purging gas. Since restricted passages 36 and 38 are of a much smaller cross-section than plenum 50, restriction to flow is provided by the restricter plate 46. This creates a back pressure ensuring the flushing gas is at a higher pressure than the inlet gas in passage 30. Therefore the flushing gas will exit around restricter plate 46 and enter passage 30.

As a broad explanation of Applicant's invention, since the flushing gas is driven radially inwardly along the valve face through the restricted passage, little potential leakage gas will approach the interface 44 between the valve disk 33 and the valve seat 43. Thus, even should there be some imperfection in the contact between the valve disk and the valve seat, there should be no leakage flow through the two.

It is preferred that the flushing gas exiting supply passage 52 and into plenum 50 be at a pressure which is greater than the pressure expected in passage 30, or any other passage associated with the particular valve. Since restricter plate 46 is spaced away from valve disk 33, this pressured gas will flow between the restricter plate 46 and the valve disk 33, along the face of valve disk 33 driving leakage flow radially inwardly away from the contact area between the valve disk and seat.

Although this invention has been disclosed with a pressurized gas, it should also be understood that if passage 30 is under negative pressure, the supply passage 52 could be simply atmospheric pressure. Further, a suction could be applied to line 42, with any leakage gas being sucked away before reaching the valve/valve seat interface. With either alternative, the restricted passage and plenum would supply benefits to the inventive system similar to those described above.

Figure 4:
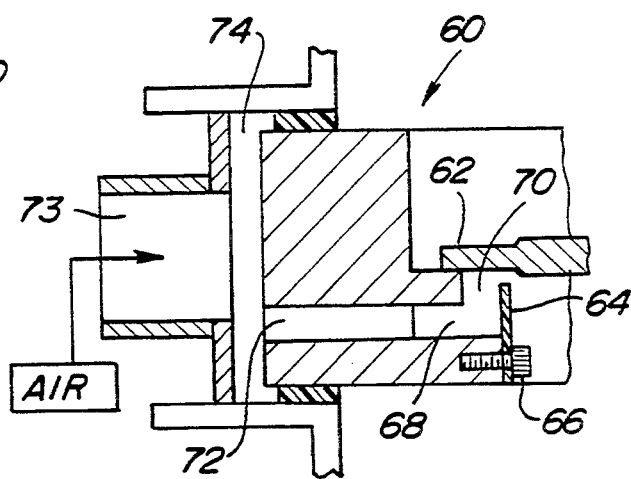
FIG. 4 is a partial cross-sectional view showing a second embodiment valve flushing mechanism.

A preferred embodiment 60 is illustrated in FIG. 4. Valve disk 62 includes a restricter plate 64 defining a restricted passage 66. Valve disk 62 contacts a valve seat 67 radially outwardly of plate 64. A plenum chamber 68 extends around the entire half of the perimeter of valve disk 62, and communicates with restricted passage 66. Again, restricter plate 64 is spaced away from valve disk 62. A supply passage 72 leads into plenum 68. An extended plenum chamber 74 receives gas from a passage 73, and the combination of chambers 74 and 68 provides the equivalent of the plenum 50 as shown in FIG. 3. Leakage will not occur between the valve disk 62 and the valve seat body 67, since the gas will have a large back pressure and since flushing gas is driven through passage 66 preventing any leakage from reaching the valve/valve seat contact area. As shown in this embodiment, the supply passage 72 extends generally perpendicular to a direction heading towards the valve seat 62. Again, since the passage is not directed towards the valve seat, it is ensured that the gas will mix adequately within the chamber 68 before moving towards the valve seat. In this way, it can be better ensured that complete coverage of the valve seat will occur, and there will not be any localized areas of insufficient gas, and other localized areas of excess gas, as may have occurred with the prior art valve purging systems.

In addition, the space between the valve disk and the valve seat allows cleaning by the injection of water or high-pressure steam between the two members.

Preferred embodiments of this invention have been disclosed. However, a worker of ordinary skill in the art would recognize that certain modifications would come within the scope of this invention. For that reason the following claim should be studied in order to determine the true scope and content of this invention.

What is claimed is:

1. A valve flushing system comprising:
a valve disk selectively seated on a valve seat, and a restricted passage leading from a plenum along said valve seat, said plenum being of a relatively large flow cross-section when compared to said restricted passage, and said plenum communicating with a source of a clean gas, said restricted passage providing flow of said clean gas along a face of said valve disk to prevent any leakage across said valve seat; and said restricted passage extending over the majority of said face of said valve disk, and at least one supply passage extending into said plenum, said supply passage extending along a direction which contains no component moving in a direction toward said valve disk.

2. The valve flushing system as recited in claim 1, wherein said supply passage extends in a direction having a component in a direction away from said valve disk.

3. The valve flushing system as recited in claim 1, wherein said supply passage extends in a direction perpendicular to a direction leading toward said valve disk.

4. The valve flushing system as recited in claim 1, wherein said plenum extends over both halves of said valve seat.

5. The valve flushing system as recited in claim 1, including a restricter plate defining said restricted passage.

6. A valve flushing system comprising:
a valve disk selectively seated on a valve seat, and a restricted passage leading from a plenum along said valve seat, said plenum being of a relatively large flow cross-section when compared to said restricted passage, and said plenum communicating with a source of clean gas, said restricted passage providing flow of said clean gas along a face of said valve disk to prevent any leakage across said valve seat; and
a restricter place defining said restricted passage, said restricter plate is spaced out of contact with said valve disk and radially inwardly of a contact area between said valve disk and said valve seat when said valve disk contacts said valve seat.

7. A valve flushing system comprising:
a valve disk selectively seated on a valve seat, and a restricted passage leading from a plenum to direct flow onto a face of said valve disk which seats on said valve seat, said plenum being of a relatively large flow cross-section when compared to said restricted passage, and said plenum communicating with a source of clean gas, said restricted passage providing flow of said clean gas along a face of said valve disk which seats on said valve seat to prevent leakage across said valve seat.

8. A valve flushing system as recited in claim 7, wherein said clean gas is directed onto said face at a location radially inwardly from said valve seat.

* * * * *